Aug. 14, 1934.  R. A. BULL ET AL  1,970,358
TRANSLUCENT OPTICAL PROJECTION SCREEN
Filed Jan. 28, 1932  2 Sheets-Sheet 1
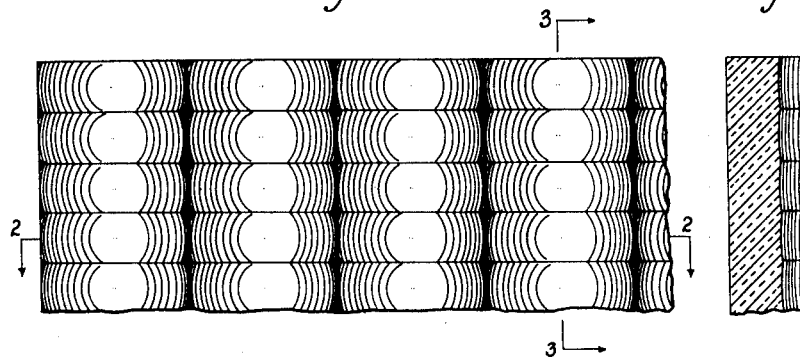
Fig. 1.
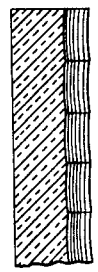
Fig. 3.
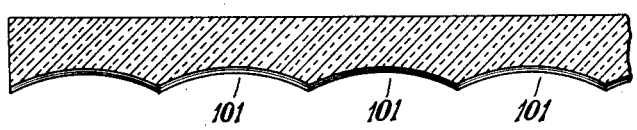
Fig. 2.
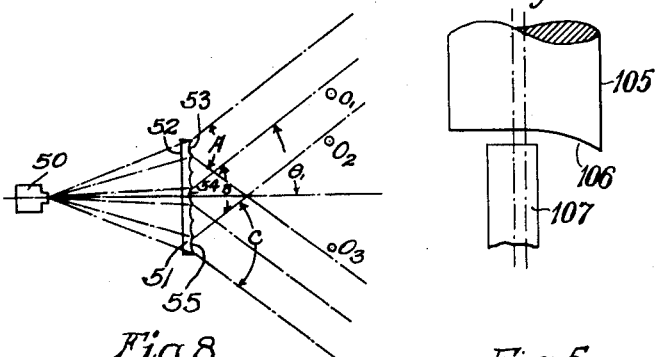
Fig. 4.
Fig. 8.
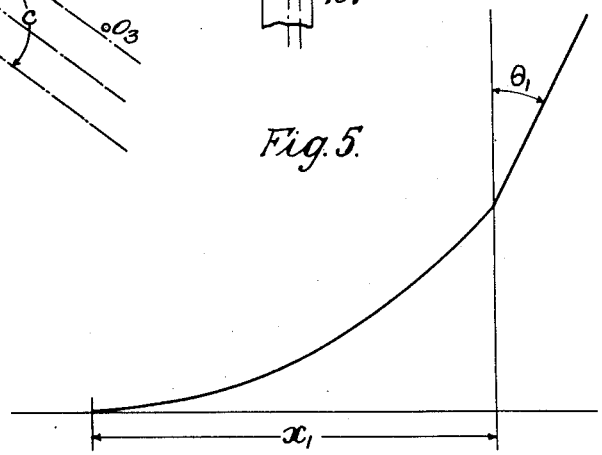
Fig. 5.
INVENTORS
R.A. BULL
C.J.P. SMALL
G.A.G. SIMPSON
C.G. MAYER
BY
C. G. Sprague
ATTORNEY Aug. 14, 1934.  R. A. BULL ET AL  1,970,358
TRANSLUCENT OPTICAL PROJECTION SCREEN
Filed Jan. 28, 1932  2 Sheets-Sheet 2
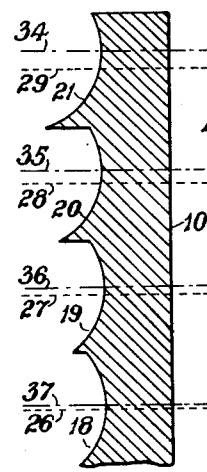
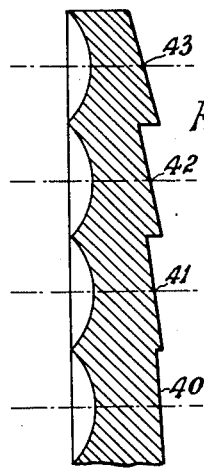
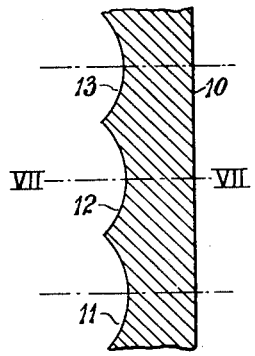
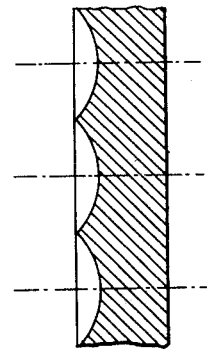
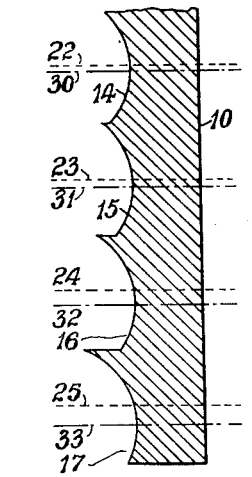
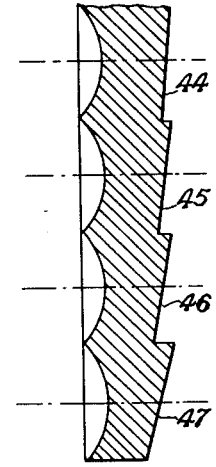
INVENTORS
R.A.BULL
C.J.P.SMALL
G.A.G.SIMPSON
C.G.MAYER
BY
ATTORNEY

Patented Aug. 14, 1934

1,970,358

UNITED STATES PATENT OFFICE

1,970,358

TRANSLUCENT OPTICAL PROJECTION SCREEN

Reginald Alfred Bull, Croydon, and Charles John Percival Small, Geoffrey Arrol Grafton Simpson, and Cornelius Graham Mayer, London, England, assignors to Electrical Research Products Inc., New York, N. Y., a corporation of Delaware Application January 28, 1932, Serial No. 589,394 In Great Britain January 29, 1931

13 Claims. (Cl. 88—24)

This invention relates to translucent optical projection screens of the kind which is located between an optical projecting apparatus, such as a kinematograph projector, and the observer, the projected light passing through the screen and being diffused thereby. Projection systems in which a translucent diffusing screen is located between an audience and the projector are sometimes known in the kinematograph trade as "rear projection systems" or "daylight" projection systems. The function of the screen in such a system is to transmit as much of the light falling on any point thereof as possible but to diffuse this light throughout a large solid angle.

For this purpose, screens of this kind have heretofore been proposed which consisted essentially of a large number of small and contiguous or nearly contiguous lenses. Structures typical of the type of screen consisting essentially of a large number of contiguous or nearly contiguous lenses are described and illustrated in British Patent No. 24,917/1911. It is to this type of translucent optical projection screen to which the invention relates.

In order that the screen shall appear to the eye equally bright irrespective of the position of the eye within the viewing angle, the total quantity of light transmitted in each direction from any elemental area must equal or approximate to the product of the total quantity of light transmitted to such elemental area in a direction normal to the screen and the cosine of the angle between the direction of transmission under consideration and the normal to the screen.

According to the invention, therefore, each lens in an optical projection screen of the type set forth is given a surface curvature or curvatures in such relation to the refractive index of the material of the lens that when a uniform pencil of parallel light falls thereon, the total quantity of light transmitted by the lens in any one direction is proportional to the cosine of the angle between that direction and the direction of the optical axis of the lens which may be, and preferably is, normal to the plane of the screen. To this end, each lens may be such that a ray of light passing therethrough or impinging thereon is bent through an angle of which the sine is substantially proportional to the distance of the ray from the optical axis of the lens where it passes through the lens.

The lenses may have one face plane or substantially plane and the other face conforming substantially to the curvature given by the following formula:—

$$\chi = K \sin(\sin^{-1} U \sin a - a)$$

When:— $a$ is the angle between the plane of the screen and any plane tangential to the curved surface of a lens and touching the curved surface at a point $p$.

$\chi$ is the distance of the point $p$ from the optical axis of the lens.

$U$ is the refractive index of the material of the lens.

$K$ is a constant which is numerically and dimensionally equal to $$\frac{\chi_1}{\sin \theta_1}$$

Where $\theta_1$ is the largest desired angle between the optical axis of the lens and a refracted ray of light, which is refracted at a point $p_1$ situated at a distance $\chi_1$ from the optical axis.

Thus $\chi_1$ is the greatest radial dimension of a lens, measured perpendicular to the optical axis.

It may be noted that $$\theta = \sin^{-1} U \sin a - a$$

Where $\theta$ is the angle through which a ray passing through the point $p$ is bent.

$a$ and $\theta$ and consequently $\theta_1$ are measured in the same units, 5 i. e. all in radians or all in degrees.

The face or faces of each lens may have the form of a concave or convex surface of revolution about the optical axis of the lens.

In certain cases, particularly if round lenses are used, the lenses may be designed to transmit no light in directions substantially normal to the screen, in which case they will transmit a hollow cone or pyramid of light. This may be effected by obscuring the centres of the lenses or by forming the surfaces of the lenses as surfaces of revolution about an axis at $\chi=0$ of the curve given by $$\chi = K\sqrt{\tfrac{1}{2}(\cos 2\theta_1 - \cos 2(\sin^{-1} U \sin a - a))}$$

Where $\theta_1$ is the semi-angle of the cone in which no light is transmitted and the other quantities are as previously defined.

It will be noticed that the above formula is, in effect, a more general form of the formula for curvature previously given, and that when $\theta_1$ is taken as equal to zero the above formula reduces to the previously stated formula for curvature. In this case, the spaces of the screen intervening between the lenses may be proportioned or prepared to transmit a certain amount of light in directions substantially normal to the screen to compensate for the deficiency of light transmitted in these directions by the lenses. To this end, the intervening spaces may be ground upon their surfaces to cause dispersion or indiscriminate scattering of the light passing therethrough so that the quantity of light transmitted thereby in various directions may approximate to the deficiency in light transmitted by the lenses themselves in these directions. Alternatively, or in addition, the lenses themselves may have an area adapted to transmit light directly without refraction. For example, the lenses may be truncated near their apexes so that they have substantially flat surfaces parallel with the plane of the screen. The area of the lenses which is adapted to transmit light directly without refraction may be ground or otherwise treated to cause dispersion or indiscriminate scattering of the light passing therethrough.

In the preferred arrangement, the lenses are plane upon one side of the screen and convex or concave substantially spheroidal segments upon the other side of the screen. In either case the segments may be truncated so as to leave a plane surface which may be such as to scatter indiscriminate light transmitted therethrough: for example these surfaces may be ground. When the lenses are circular in shape or cross-section in the plane of the screen the intervening spaces between their margins will have parallel front and back faces which may be ground or otherwise treated so that they scatter the light indiscriminately.

It is preferred, however, to employ lenses which have a polygonal cross-section or shape in the plane of the screen and so to build up these lenses that they are substantially contiguous with one another with substantially no intervening spaces, after the manner of cells in a honeycomb. Preferably the lenses have a square or rectangular cross-section in the plane of the screen. When the lenses are of rectangular cross-section, this cross-section may be of such a shape that each lens distributes a diverging beam of light over a solid angle of such a cross-sectional shape as to embrace all positions from which the lens may be viewed. For example, the horizontal dimension of the lens may be twice that of the vertical dimension so that the angle in a horizontal plane through which the light is distributed may be substantially twice that through which the light is distributed in a vertical plane.

In another arrangement, the lenses may have cylindrical front surfaces and cylindrical back surfaces, the axes of the two cylinders being at right angles. The curvatures of the two cylinders may be defined by the formula before stated, namely, $x = K \sin(\sin^{-1} U \sin a - a)$. However, the constant $K$ may, and preferably has, different values for the two cylinders so that, for example, the angle through which the light is diffused in the vertical direction is less than that through which the light is diffused in the horizontal direction. A screen employing lenses of this nature may be constructed of material having horizontal cylindrical ribs or grooves extending throughout its length on one surface and vertical cylindrical ribs or the grooves extending throughout its length on the other surface, substantially as described in British Patent No. 24917/1911, the curvatures of the two cylinders being determined as hereinbefore set forth.

Most cinematograph and similar optical projection screens are viewed by observers mainly or entirely located below the level of the screen. Consequently, it is desirable that the various elements of the screen should, as well as dispersing the light through a predetermined solid angle sufficient to embrace the observers, preferably also direct the light generally in a slightly downward direction. To this end, some or all of the lenses may be so designed that, in addition to bending the light as hereinbefore defined, they bend all the light falling upon them through a predetermined solid angle. Thus, for example, the lenses near the bottom of the screen may disperse the light in the manner set forth without additionally bending it. The lenses some short distance from the bottom of the screen may bend all the light slightly, while those near the top of the screen bend the light considerably. To secure this result, the lenses may be given a prismatic form, for example, by prismatic ridges upon the back of the screen or, and preferably, the centres of area of the lenses may be displaced from the optical axes of the lenses, this displacement being a minimum for lenses near the bottom of the screen and a maximum for lenses near the top of the screen.

While the light falling upon any individual lens may be regarded as parallel, the pencil of light falling on any individual lens near the margin of the screen will not, in general, be parallel with the pencil of light falling on the central lens of the screen and will not be normal to the screen. Since all the lenses are to be viewed from the same series of positions, the marginal lenses are preferably so designed that, in addition to diffusing the light through a predetermined solid angle, they bend the light pencil falling upon them to compensate for the divergence of the light falling upon them from normality to the screen. This can be effected by giving to the lenses near the margin of the screen an asymmetrical or wedge-like form as well as their spheroidal or other curvature which serves to disperse the light through a predetermined solid angle.

To this end a screen provided with lenses as hereinbefore set forth may be combined with a refracting surface either separate from or integral with the lenses themselves through which all the light passes and which bends all rays passing therethrough through an angle, the projection of which upon a plane through the centre of the screen and normal to the screen will increase with distance from the centre of the screen. This refracting surface may be discontinuous consisting of a series of prismatic steps of differing angle. Theoretically, each prismatic step should have a curved refracting face, but, in practice, substantially flat refracting faces approximate sufficiently the ideal condition. Consequently, this same device may be used to direct the light in a general direction towards observers not symmetrically disposed about the normal through the centre of the screen and also to compensate for the divergence from normal so far as the divergence from normal in vertical planes only is concerned. The same device, namely a prismatic refracting surface, may be utilized.

For correcting for the divergence from normal so far as this divergence in a horizontal plane is concerned, of light falling upon lenses near the margin of the screen, the lenses may be constructed with their optical axis spaced away from their centre of area, the distance between the optical axis and the centre of area being greater for those nearer the margin of the screen and zero for those in the centre of the screen.

Alternatively the divergence from normal of the light impinging upon the lenses near the margin of the screen, so far as this divergence in a vertical plane is concerned, may be compensated for by constructing the lenses in any vertical line with their optical axes spaced away from their centres of area by different amounts, the distance between the optical axes and the centre of area being greater for those nearer the margins of the screen and zero for those in the centre of the screen. This device may also be utilized to direct the light in a general direction towards observers not symmetrically disposed about the normal through the centre of the screen, for example, disposed below the centre of the screen. To this end the distance between the optical axes and centres of area of the lenses near the top of the screen would be increased relative to the distance between the optical axes and centres of area of the lenses near the centre of the screen. Similarly it is possible to compensate for the divergence in a horizontal plane of the light falling upon the screen by a refracting surface which may be discontinuous consisting of a series of prismatic steps of diverging angle.

In the accompanying drawings

Fig. 1 is a front elevation of a small portion of one simple form of optical projection screen according to the invention;

Fig. 2 is a horizontal section through the fragment of screen illustrated in Fig. 1 on the line II—II;

Fig. 3 is a vertical section through the fragment of screen illustrated in Fig. 1 on the line III—III;

Fig. 4 is a diagrammatic representation of a milling tool and of a piece of tool stock utilized for the preparation of a forming or moulding die for manufacturing the screen;

Fig. 5 is a curve on a large scale illustrating the profile of the lenses for a screen manufactured of cellulose acetate of which the maximum radial dimension of any lens is equal to 0.05" and the maximum angle of dispersion is equal to 25°, the refractive index of the material being 1.42;

Fig. 6 is a diagrammatic section of a preferred form of translucent screen arranged to compensate for the divergence of light falling upon the screen at points away from the centre thereof from normal;

Fig. 7 is a section on the line VII—VII of Fig. 6; and

Fig. 8 is a schematic showing of a projection system employing an optical projection screen according to this invention.

Referring now to Fig. 1 of the accompanying drawings the screen consisting of a sheet of cellulose acetate of convenient thickness, preferably from 1/8" to 1/4" thick is embossed upon its front surface, that is the surface nearer the observers, with a plurality of contiguous recesses 101. These recesses have surfaces which are surfaces of revolution of a curved line. The profile of the recesses is determined from the formula hereinbefore stated for the particular conditions in which the screen is to be used having regard to the refractive index of the material used which in the use of cellulose acetate is 1.42. The profile of the lenses is illustrated in Fig. 5 for the case in which the maximum angle $\theta_1$ through which the light to be dispersed by any one lens is 25° and the maximum radial dimension of any one lens is 0.05".

The lenses comprising the screen illustrated in Figs. 1, 2 and 3 of the drawings are of rectangular cross-section or shape in the plane of the screen and contiguous, the horizontal dimension being considerably greater than the vertical dimension. The pencil of light issuing through each lens will have a cross-sectional shape similar to that of the lens.

The preferred method of manufacturing the screen illustrated in Figs. 1, 2 and 3 consists in forming a press tool or die having a number of spheroidal projections thereon of correct contour and bringing this press tool or die under pressure in contact with a surface of a flat sheet of material such as cellulose acetate, heating the press tool or die, if necessary, to such a temperature that the material of the screen is rendered just plastic. The press tool or die is made from a series of strips of rectangular cross-section having a width equal to the width of one lens. A cutter for milling the required projections upon the strips is illustrated in Fig. 4 of the accompanying drawings. The cutter 105 is an end mill having one or more cutting edges 106 formed to the required profile as indicated in Fig. 5. The profile of the cutting edge can be checked by projecting a large image of the cutting edge by means of a lantern and comparing this with a hand drawn curve similar to Fig. 5. The long strips are placed beneath the cutter 105 which is rotated about its axis and is fed axially towards the strip 107 so that it cuts away a portion of the strip 107 leaving a spheroidal boss or projection. The strip 107 is then advanced by a distance equal to the length of one lens and the process is repeated. Where it is desired that the optical axis of the lens should be coincident with the centre of area of the lens the cutter 105 is mounted so that its axis is coincident with the centre of the strip 107. If it is desired that the lenses in any one row should bend all the light through a predetermined angle as well as dispersing the light through a predetermined solid angle the cutter 105 is mounted so that its axis is displaced from the centre of the strip 107 by a small amount depending on the amount of bending of the light required.

It is preferred, in order to average out the departures from correct profile owing to inaccurate grinding of the cutter 105 to prepare a considerable number of cutters and to cut adjacent bosses on the strips 107 with different cutters so that the average profile of all the bosses on the strips will more likely be correct than would be the case if all the bosses were formed with a single cutter.

A plurality of strips 107 are mounted together side by side to form a die of length equal to the height of the screen and convenient width. The die so formed is mounted in a press so that it can be forced into contact with the surface of a flat sheet of screen material such as cellulose acetate. The die is connected in circuit with the secondary winding of an electrical transformer capable of delivering a very high value of current, such, for example, as an electrical welding transformer. By appropriately regulating the current flowing along the length of the die the die is brought to the proper temperature which is best found by experiment.

In Figs. 6 and 7 of the drawings there is illustrated a screen in which the lenses are formed to compensate for the divergence from normal of the light falling upon the lenses near the margin of the screen.

Referring now to Fig. 6, the sheet of cellulose acetate or like material is embossed upon its front surface with a plurality of curved indentations 150 of which the profile is determined in a manner hereinbefore set forth. The lenses 11, 12 and 13 near the centre of the screen are formed so that the centre of the cross-section of each lens lies in the optical axis of the lens.

Lenses more remote from the centre of the screen, such as the lenses 14, 15, 16, 17, 18, 19, 20 and 21 are formed with the optical axis of the lens displaced from the centre of the cross-section of the lens towards the margins of the screen. In the drawings the dotted lines 22, 23, 24, 25, 26, 27, 28 and 29 represent the normals to the screen through the centres of area of the several lenses. The chain lines 30, 31, 32, 33, 34, 35, 36 and 37 represent the optical axis of the several lenses.

It will be appreciated that all lenses in any one vertical column of lenses have the same configuration. As shown in Fig. 7 the rear of the screen is plain near the centre thereof. As the edges of the screen are approached, however, a plurality of prismatic or wedge shape recesses or steps 40, 41, 42, 43, 44, 45, 46, 47 milled out from or embossed in the screen to leave flat faces 40, 41, 42, 43, 44, 45, 46 and 47. The angles of these flat faces are so determined, having regard to the refractive index of the material of which the screen is made and to the distance from the screen at which the projector will be placed that the divergent incident rays falling upon the faces in any one vertical plane and refracted thereby will be rendered substantially normal to the screen before falling upon the curved surfaces of the lenses upon the other side of the screen.

A typical projector system is illustrated in Fig. 8. A projector 50 is arranged to project pictures on the rear plane surface 52 of screen 51, which pictures are visible to observers $O_1$, $O_2$ and $O_3$ positioned in front of the screen. The front surface of the screen is recessed in the manner hereinbefore described, so that the light rays from the projector 50 incident upon each recess are uniformly distributed through a predetermined solid angle. This solid angle bears a definite relationship to the angle $\theta_1$, shown for recess 54, which relationship is hereinbefore set forth. Thus, to an observer located anywhere within the angular space B, the recess 54 will appear of the same brightness. Likewise, to an observer located anywhere within the angular spaces A and C, the recesses 53 and 55, respectively, will appear equally bright. Consequently, each of the observers $O_1$, $O_2$ and $O_3$ will be able to see the whole picture with equal brightness. The size of each recess with respect to the whole screen has been greatly exaggerated for clearness of illustration. In any actual material system the dimensions will be such that all of the light rays from the projector to any one recess will be practically parallel.

What is claimed is:

1. A screen for displaying projected images comprising a plurality of light transmitting and refracting portions in number at least equal to the number of elemental portions of the image necessary to constitute a visible image and arranged side by side in the image space, one screen portion located at each necessary elemental portion of the image and each screen portion having such surface curvature in relation to the refractive index of the portion that when a uniform pencil of parallel rays of light falls thereon, the total quantity of light transmitted by the portion in any one direction is proportional to the cosine of the angle between that direction and the direction of the optical axis of the portion, the optical axes of the several portions being so positioned with respect to one another that when a beam of substantially parallel rays of light are projected on one surface of said screen at least some of the rays transmitted through each portion passes through a given point located on the opposite side of said screen.

2. A screen for displaying projected images comprising a plurality of light transmitting and refracting lens portions in number at least equal to the number of elemental portions of the image necessary to constitute a visible image and arranged side by side in the image space, one screen portion located at each necessary elemental portion of the image and each lens portion having such surface curvature in relation to the refractive index of the material of the portion that a ray of light incident thereon in a direction parallel to the optical axis in passing therethrough is bent through an angle of which the sine is substantially proportional to the distance of the ray from the optical axis of the lens portion where it passes through the lens and the optical axes of the several lenses being so positioned with respect to one another that when a beam of substantially parallel rays of light are projected on one surface of said screen at least some of the rays transmitted through each portion passes through a given point located on the opposite side of said screen.

3. A screen for displaying projected images comprising a plurality of light transmitting and refracting portions in number at least equal to the number of elemental portions of the image necessary to constitute a visible image and arranged side by side in the image space, one screen portion located at each necessary elemental portion of the image, and each screen portion having one face substantially plane and the other face conforming substantially to the curvature given by $\chi = K \sin(\sin^{-1} U \sin a - a)$ where $a$ is the angle between the plane of the screen and any plane tangential to the curved surface of the lens portion and touching the curved surface at a point $p$, $\chi$ is the distance of the point $p$ from the optical axis of the lens, $U$ is the refractive index of the material of the lens, $K$ is a constant which is numerically and dimensionally equal to $$\frac{\chi_1}{\sin \theta_1},$$

where $\theta_1$ is the largest desired angle between the optical axis of the lens and a refracted ray of light, which is refracted at a point $p_1$ situated at a distance $\chi_1$ from the optical axis, and $\chi_1$ is the greatest radial dimension of said lens, measured perpendicular to the optical axis.

4. A screen for displaying projected images, according to claim 1, in which the screen portions are polygonal in shape and all of the sides of each portion is contiguous to the sides of the other portions, except the boundary portions of the whole screen.

5. A screen for displaying projected images, according to claim 1, in which the screen portions are rectangular in shape and all of the sides of each portion is contiguous to sides of other portions, except the boundary portions of the whole screen.

6. A screen for displaying projected images comprising a sheet of substantially transparent material, one surface of which is substantially plane and the other provided with a large number of recesses, the surface curvature of each recess conforming substantially to the curvature given by $\chi = K \sin(\sin^{-1} U \sin a - a)$ where $a$ is the angle between the plane of the screen and any plane tangential to the curved surface of the lens and touching the curved surface at a point $p$, $\chi$ is the distance of the point $p$ from the optical axis of the lens, $U$ is the refractive index of the material of the lens, $K$ is a constant which is numerically and dimensionally equal to $$\frac{\chi_1}{\sin \theta_1},$$

where $\theta_1$ is the largest desired angle between the optical axis of the lens and a refracted ray of light, which is refracted at a point $p_1$ situated at a distance $\chi_1$ from the optical axis and $\chi_1$ is the greatest radial dimension of said lens measured perpendicular to the optical axis.

7. A screen for displaying projected images, according to claim 6, in which that portion of the surface of the sheet exclusive of the surface occupied by the recesses of predetermined dimensions is roughened to cause indiscriminate scattering of the light emitted from that portion of the sheet.

8. A screen for displaying projected images, according to claim 6, in which a small portion at the base of each recess is roughened to cause indiscriminate scattering of the light emitted from those portions of the sheet.

9. A screen for displaying projected images comprising a sheet of substantially transparent material, one surface of which is substantially plane and the other provided with a large number of nodules, the surface curvature of each nodule conforming substantially to the curvature given by $\chi = K \sin(\sin^{-1} U \sin a - a)$ where $a$ is the angle between the plane of the screen and any plane tangential to the curved surface of the lens and touching the curved surface at a point $p$, $\chi$ is the distance of the point $p$ from the optical axis of the lens, $U$ is the refractive index of the material of the lens, $K$ is a constant which is numerically and dimensionally equal to $$\frac{\chi_1}{\sin \theta_1},$$

where $\theta_1$ is the largest desired angle between the optical axis of the lens and a refracted ray of light, which is refracted at a point $p_1$ situated at a distance $\chi_1$ from the optical axis and $\chi_1$ is the greatest radial dimension of said lens measured perpendicular to the optical axis.

10. A screen for displaying projected images, according to claim 9, in which a portion of the surface of each nodule in the vicinity of its optical axis is flattened and the flat surface roughened to cause indiscriminate scattering of light emitted from such portions.

11. A screen for displaying projected images, according to claim 9, in which the space between each nodule is roughened.

12. A screen for displaying projected images, according to claim 9, in which the top of each nodule and also the space between nodules is roughened.

13. A screen for displaying projected images comprising a portion of extended area having a large number of lenticular surfaces of cylindrical curvature whose axes are parallel forming one face of the screen and another portion of substantially equal area to said first portion having a large number of lenticular surfaces also of cylindrical curvature whose axes are parallel but at approximately right angles to the axes of the first mentioned surfaces forming the other surface of the screen, the curvature of said lenticular surfaces each conforming substantially to the curvature given by $\chi = \chi \sin(\sin^{-1} U \sin a - a)$ where $a$ is the angle between the plane of the screen and any plane tangential to the curved surface of the lens and touching the curved surface at a point $p$ from the optical axis of the lens, $U$ is the refractive index of the material of the lens, $K$ is a constant which is numerically and dimensionally equal to $$\frac{\chi_1}{\sin \theta_1},$$

where $\theta_1$ is the largest desired angle between the optical axis of the lens and a refracted ray of light, which is refracted at a point $p_1$ situated at a distance $\chi_1$ from the optical axis and $\chi_1$ is the greatest radial dimension of said portion measured perpendicular to the optical axis.

REGINALD ALFRED BULL.
CHARLES JOHN PERCIVAL SMALL.
GEOFFREY ARROL GRAFTON SIMPSON.
CORNELIUS GRAHAM MAYER.